United States Patent [19]

Pollard

[11] Patent Number: 5,452,797
[45] Date of Patent: Sep. 26, 1995

[54] ROLL PACKAGE

[75] Inventor: James R. Pollard, Greene, N.Y.

[73] Assignee: International Paper Company, Purchase, N.Y.

[21] Appl. No.: 286,104

[22] Filed: Aug. 4, 1994

Related U.S. Application Data

[63] Continuation of Ser. No. 82,321, Jun. 24, 1993, abandoned.

[51] Int. Cl.$^6$ ............................................. B65D 85/672
[52] U.S. Cl. ............................................. 206/416; 206/413
[58] Field of Search ............................ 206/389, 407, 206/413, 410, 416, 316.1

[56] References Cited

U.S. PATENT DOCUMENTS

| | | | |
|---|---|---|---|
| 2,883,045 | 4/1959 | Abramson | 206/410 X |
| 3,261,460 | 7/1966 | Davis | 206/407 |
| 4,148,395 | 4/1979 | Syracuse et al. | 206/414 |
| 4,505,387 | 3/1985 | Seto | 206/414 |
| 4,516,892 | 5/1985 | Curro, Jr. | 206/413 X |
| 4,733,777 | 3/1988 | Van Geyte et al. | 206/316 |
| 4,763,785 | 8/1988 | Bradley | 206/389 |
| 4,911,299 | 3/1990 | Peeters | 206/410 |
| 5,090,566 | 2/1992 | Yount | 206/389 X |
| 5,133,171 | 7/1992 | Chase et al. | 53/409 |
| 5,167,322 | 12/1992 | Lemaire | 206/389 X |
| 5,222,601 | 6/1993 | Takahashi et al. | 206/416 |

FOREIGN PATENT DOCUMENTS

| | | |
|---|---|---|
| 0181417 | 5/1986 | European Pat. Off. . |
| 0350093 | 1/1990 | European Pat. Off. . |
| 0414265 | 2/1991 | European Pat. Off. . |
| 0488738 | 6/1992 | European Pat. Off. . |

OTHER PUBLICATIONS

International Search Report dated Aug. 19, 1994 for corresponding PCT application.
"Roll Package", *Research Disclosure*, May 1983; Industrial Opportunities Limited of Homewell, Havant, Hamshire, U.K.; p. 190.

*Primary Examiner*—Paul T. Sewell
*Assistant Examiner*—Ted Kavanaugh
*Attorney, Agent, or Firm*—Ostrager, Chong & Flaherty

[57] ABSTRACT

A package for a roll of photosensitive material coiled on a central core in convolutions of increasing radius and having generally flat end surfaces, which comprises an opaque moisture-proof leader joined to the free end of the roll of photosensitive material and wrapped circumferentially at least once around the roll and being of sufficient width to cover the roll, a pair of side lips extending beyond the side edges of the leader and being formed either by a strip of tearable adhesive material attached to each side edge of the leader and which overlap the side edges of the leader or by a strip of tearable adhesive material attached to the leader and which overlaps each side edge of the leader, said pair of lips having an adhesive on their top most surface, the said pair of edge lips being folded down over the two ends of the roll, together with two annular end covers for the ends of the roll which are adhered to the adhesive covered folded down side lips thereby holding the end covers in place over the ends of the roll. Preferably the opaque moisture-proof leader is wrapped at least twice around the roll.

9 Claims, 3 Drawing Sheets

ROLL PACKAGE

This is a continuation of application Ser. No. 08/082,321 filed on Jun. 24, 1993 now abandoned.

BACKGROUND OF THE INVENTION

This invention relates to packaging of photosensitive material for example rolls of photographic paper or rolls of photographic film, which packaging is adapted to be daylight loaded into a box-like cassette which can be attached to an exposure apparatus.

Numerous proposals have been made for such packaging but often these designs have been either too expensive or too cumbersome to operate. That is to say it is not easy to package the roll of photosensitive material in a light-tight manner or more importantly when the roll has been placed in the box-like cassette it has proved difficult to unwind the photosensitive material from the roll.

Proposals for packing rolls of photosensitive material have been made for example in U.S. Pat. Nos. 4,148,395, 4,505,387, 4,911,299 and 5,133,171; in European patent application E.P. 181417 and in Research Disclosure 22932. (Research Disclosures are published by Industrial Opportunities Limited of Homewell, Havant, Hampshire, U.K.).

SUMMARY OF THE INVENTION

It is the object of the present invention to provide a package for a roll of photosensitive strip material which can be loaded into a box-like cassette in day-light and wherein the light-sensitive material can be pulled smoothly out of the cassette and fed into the exposure apparatus.

According to the present invention there is provided a package for a roll of photosensitive material coiled on a central core in convolutions of increasing radius and having generally flat end surfaces, which comprises an opaque moisture-proof leader joined to the free end of the roll of photosensitive material and wrapped circumferentially at least once around the roll and being of sufficient width to cover the roll, a pair of side lips extending beyond the side edges of the leader and being formed either by a strip of tearable adhesive material attached to each side edge of the leader and which overlap the side edges of the leader or by a strip of tearable adhesive material attached to the leader and which overlaps each side edge of the leader, said pair of lips having an adhesive on their top most surface, the said pair of side lips being folded down over the two ends of the roll, together with two annular end covers for the ends of the roll which are adhered to the adhesive covered folded down side lips thereby holding the end covers in place over the ends of the roll.

Preferably when the pair of side lips are formed from a strip of tearable adhesive material attached to each side edge of the leader a strip of backing tape is placed over each side edge strip. This helps to reinforce the leader and prevent it tearing cross-web as it is unrolled from the cassette. These strips may be composed of a strong fabric based adhesive material.

Preferably the pair of side lips extending beyond the side edges of the leader are formed by a strip of tearable adhesive material.

Preferably in order to ensure that the two annular end covers are firmly held on each end of the roll, these end covers are so formed that part of them can be folded axially inside one of said core ends. Most preferably the inner portion of each end cover can be folded axially inside one of said core ends and sealed inside the core ends.

The inner portion of each end cover may be sealed inside each core by use of a contact adhesive or by heat-sealing using a hot-melt adhesive.

Preferably a plug which is able to just fit into the core is used to force each annular end cover against each core end so that the adhesive on the lips of the opaque cover secure the end cover to the core end and the centre of each annular end cover is forced into the core. Preferably each annular end cover is cut in a star manner so that when the plug is inserted into the core end the segments of the star are folded into the core end. In some cases it it preferred that the plug is left in each core. However if the plug is removed then preferably each segment of the centre star of the annular end cover is adhesively secured in the core.

The opaque moisture proof leader is preferably non-tearable. A suitable material for the leader is a strong polyethylene film whieh comprises sufficient carbon-black to render it opaque to light. Metallised polymer foils may also be used.

The tape or strip of material which is used to form the side lips can be composed of any relatively easily tearable material which can carry a layer of adhesive, preferably a pressure sensitive adhesive. Preferably this material is relatively light opaque. Preferably this material is paper-based so that it is easy to tear.

Preferably the lips which extend beyond the side edges of the leader comprise lines of weakness or slits therein which makes it easier to fold these lips onto the end faces of the roll. Preferably these lines of weakness do not extend to the side edges of the leader.

Usually the core is composed of a thick card-board roll to which a heat sensitive glue will adhere readily.

The leader may be spliced on to the end of the roll of photosensitive material using a length of pressure-sensitive adhesive covered plastic material tape. Alternatively a number of strips of such plastic material may be used across the length of the leader to secure it to the roll of photosensitive material. However whatever method of securing the leader to the end of the roll of photosensitive material is used this join must be sufficiently strong so that when the exposed end of the leader is pulled the lips are torn off the leader and the roll of photosensitive material commences to unroll.

The annular end covers may be made of any light opaque flexible material or laminate to which a pressure sensitive adhesive will adhere. Conveniently it may be made of a plastics material such as polyethylene which comprises carbon black or a white opaquing pigment such as titanium dioxide.

In one embodiment the external end of the leader is tapered down. Preferably the end of the leader is secured to the underlying leader by use of a strip of tearable tape.

BRIEF DESCRIPTION OF THE DRAWINGS

The accompanying drawings will serve to illustrate the invention.

In all the figures the same numbers have the same signification.

DESCRIPTION OF THE PREFERRED EMBODIMENT

Figure 1:
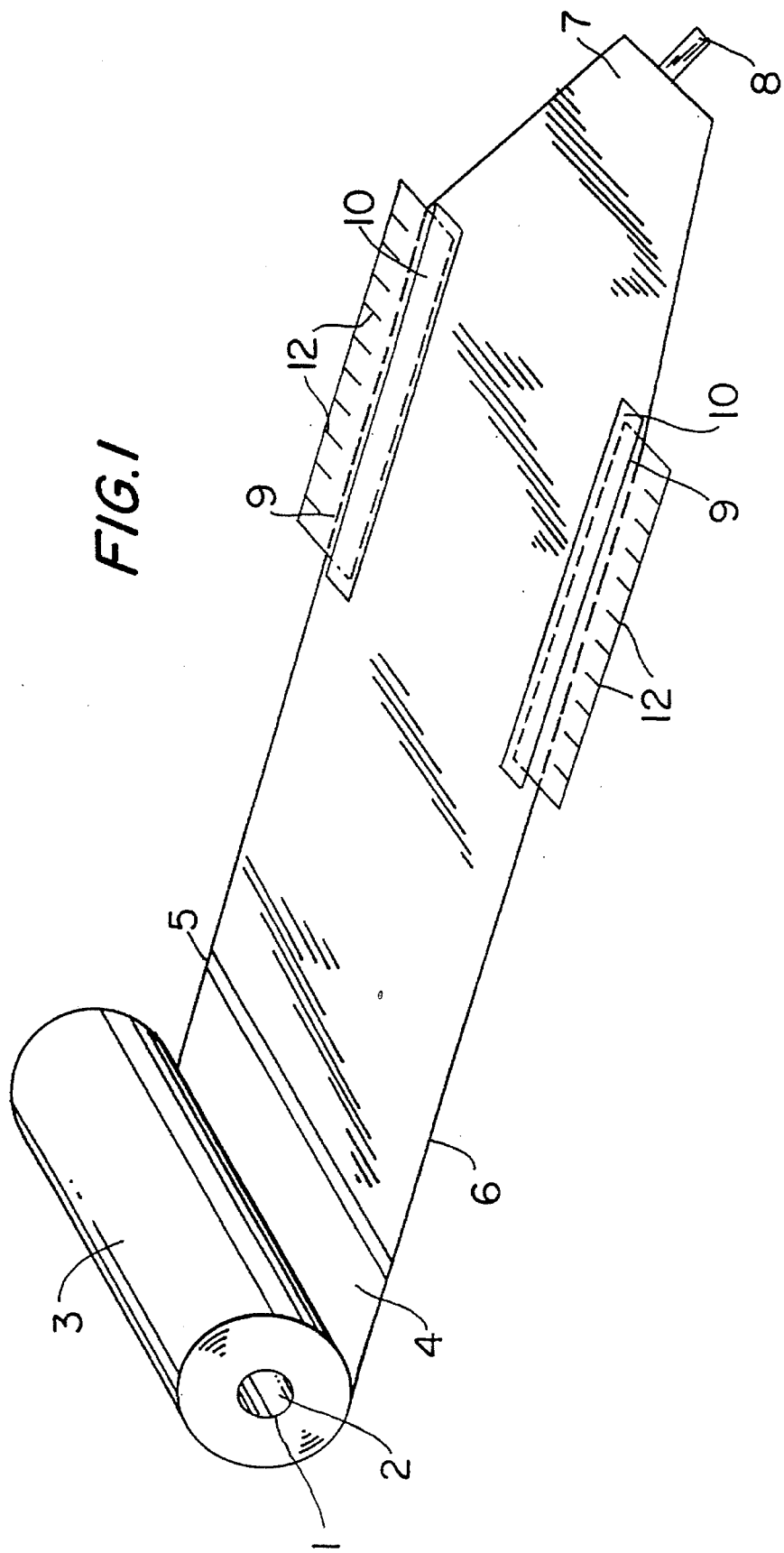
FIG. 1 is a perspective view of a package for roll film material with leader unrolled.

In FIG. 1 a central core 1 composed of hard cardboard has an open centre 2. Rolled onto core 1 is a roll of photosensitive film 3. Attached by a splice 5 to the end of the film roll 3 is a leader 6 composed of high strength polyethylene which has been rendered light opaque by the presence therein of carbon black particles. The other end of the leader 7 has been tapered and to this tapered end is attached a strip of tearable tape 8 covered on the side shown in this figure with a pressure sensitive adhesive.

Adhered to each edge of leader 6 is a strip of tape 9. These strips are attached to the leader by an adhesive. Each strip 9 is covered on its under face (as shown in this figure) with a layer of pressure sensitive adhesive and each strip 9 bears a series of slits 12 which do not extend as far as the leader 6. A piece of backing tape 10 covers each strip 9.

The side edges of strip 9 constitute a pair of side lips extending beyond the side edges of the leader 6.

Figure 2:
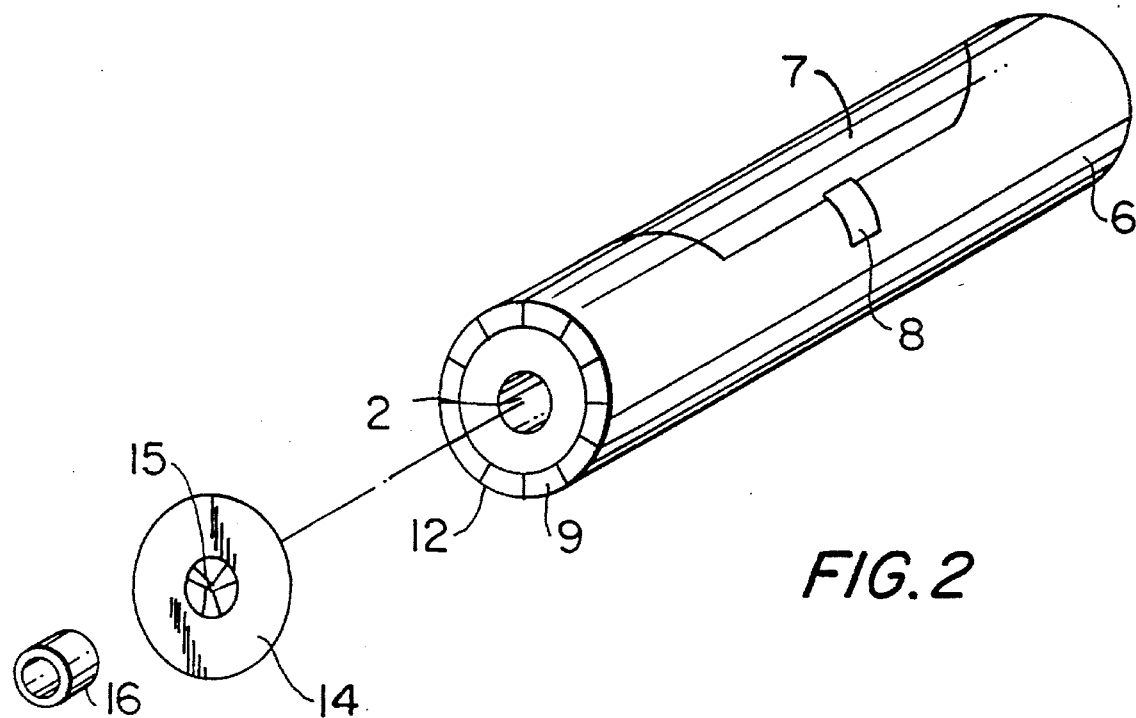
FIG. 2 is the same perspective view with the leader rolled up.

In FIG. 2 the leader 6 has been wrapped around the roll of film 3 on the core 1. As can be seen from FIG. 1 the leader 6 is long enough to encircle the roll 3 three times. Strip 9 has been folded so that it lies over the end of the roll of film 3. This folding has been aided by the presence of the slits 12 therein. The face of strip 9 shown in this drawing is covered with a layer of pressure sensitive adhesive.

Shown separated from the wrapped roll of film 3 is an annular end cover 14 whose centre has been cut to form segments 15.

This annular end cover 14 is composed of polyethylene which has been loaded with enough titanium dioxide to render it light-opaque.

Shown separated from the end cover 14 is a plug 16.

Figure 3:
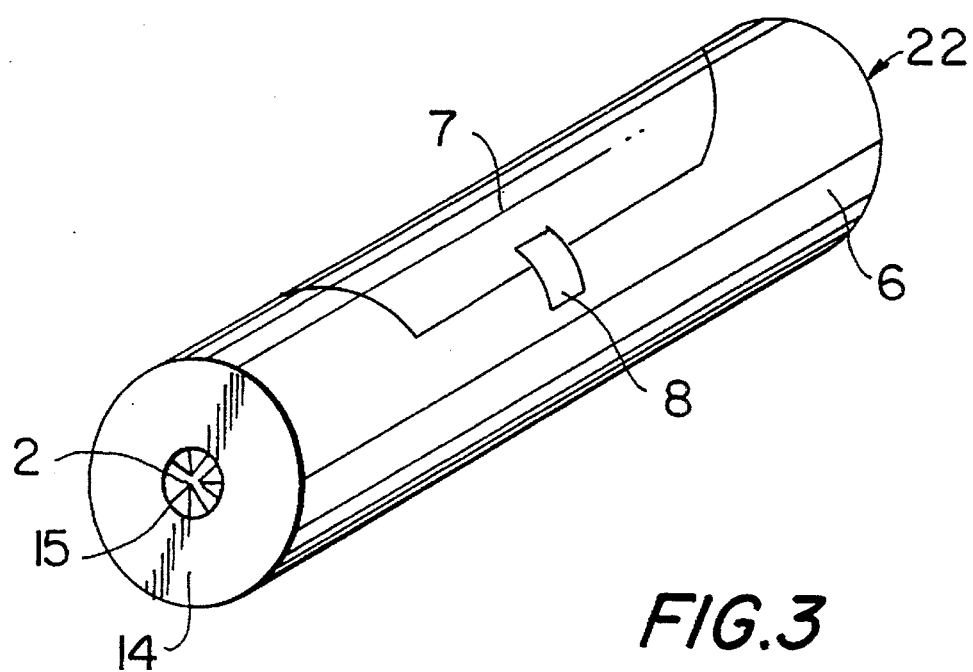
FIG. 3 is the complete package ready for insertion into a cassette.

FIG. 3 shows the roll 3 of FIG. 2 with the annular end cover 14 in position over the end of the film roll 3. The segments 15 have been forced into the hollow end 2 of the core 1. They have been adhered therein using a heat sensitive adhesive.

The roll 3 of FIG. 3 can now be mounted into a cassette. This is referred to as package 22.

Figure 4:
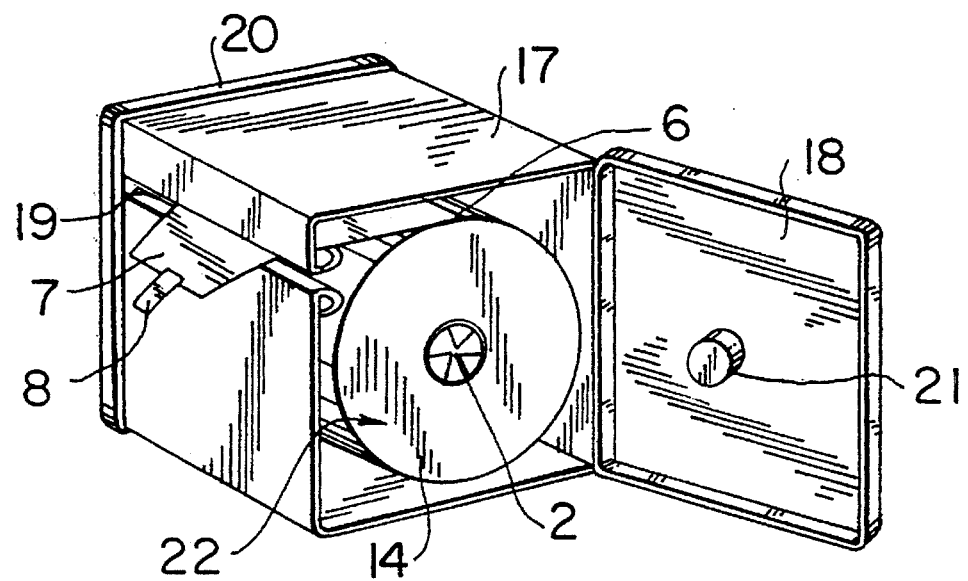
FIG. 4 shows the package in a cassette.

In FIG. 4 is shown a light-tight cassette 17 with one door 18 opened to show the package 22 therein. The cassette 17 comprises a slot 19 through which the tapered end 7 of the leader 6 is shown protruding.

There is a similar door 20 on the other side of the cassette 17. Mounted in the centre of door 18 (and also door 20 but not shown) is a circular truncated tube 21. When the door 18 is shut this tube 21 fits into the core 1 and together the truncated tubes on the two doors 18 and 20 hold the roll 3 in the cassette and allow the roll 3 to rotate when the leader 6 is pulled.

Figure 5:
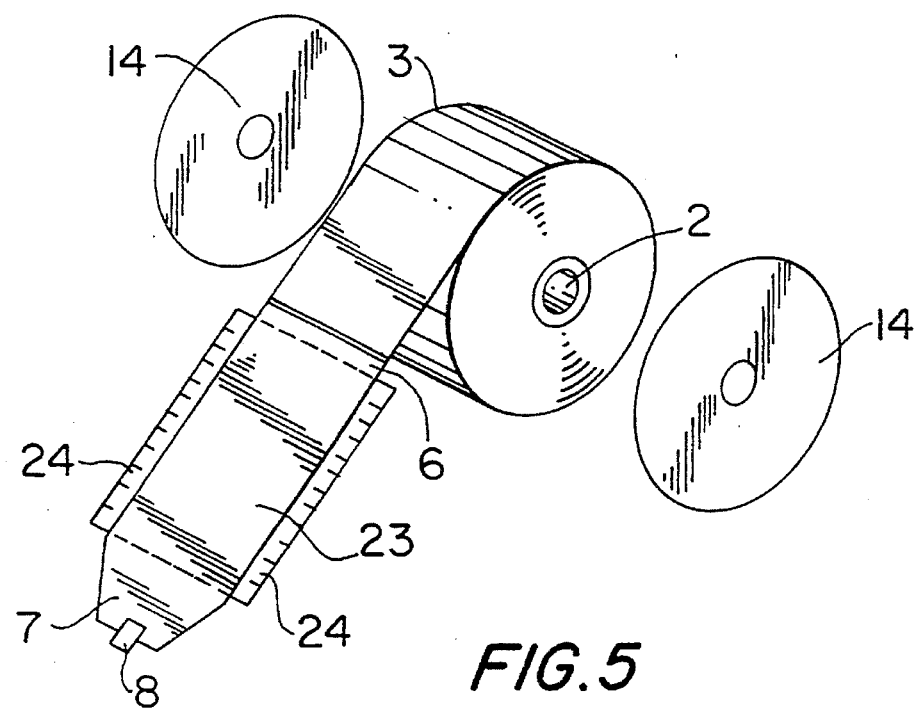
FIG. 5 shows an alternative packaging wherein a strip of tearable material 23 is used instead of two lengths of tape.

FIG. 5 shows an alternative embodiment where instead of strips of tape a strip of material is used.

In FIG. 5 a roll of film 3 is rolled on core 1. A leader 6 is spliced by a splice 5 to the end of the film 3. Adhered underneath the leader 6 is a strip of tearable material 23 which overlaps the side edges of the leader 6. The parts 24 of the strip 23 which overlap the side edges of the leader 6 have slits 12 therein and these constitute the pair of side lips.

Placed alongside the film roll 3 are the two annular end covers 14.

OPERATION OF THE INVENTION

In operation in the dark a roll of film material 3 of the required length is tightly wound on to the cardboard core 1. The leader 6 is then spliced by a splicing strip 5 to the end 4 of the roll of film 3.

Strips of tape 9 are then adhered on the leader 6. These strips already comprise slits 12. The end piece of tape 8 is adhered to the tapered end 7 of the leader 6.

The strip 9 and the strip 8 are all composed of a paper-based tape covered on the sides already indicated with a pressure-sensitive adhesive tape. They are black in colour and easily tearable.

Then still in the dark and as shown in FIG. 2 the leader 6 is tightly wound on to the roll of film 3 and its end secured to itself by the strip 8. The ends of the strip 9 which overlap the edges of the leader 6 are then bent over so that they partially cover the end of the wound film 3. The slits 12 enable the strip 9 to be bent over more easily.

The annular end cover 14 is then firmly pushed on to each end of the wound film 3. This adheres to the strip 9 which have their adhesive face outwards and covers each end of the wound film 3. A similar annular end cover 14 is pushed into position at the other end of wound film 3.

The plug 16 is then forced into the centre of each end cover 14 and this breaks the centre of the end cover 14 and forces the segments 15 in to the hollow core 2. These segments are adhered by adhesive in the hollow core 2. This is the state shown in FIG. 3.

The package 22 is now light-tight and can be placed in room-light into the cassette 17 shown in FIG. 4. To do this door 18 is opened and the package 22 is fitted over the tube 21 on the door 20. The strip 8 is lifted up and the tapered leading edge 7 of the leader 6 is fed into the slot 19 so that its end protrudes through the slot. The door 18 is then closed so that the tube 21 on door 18 fits into the hollow core 2 at the end of the package 22 shown in FIG. 4. The package 22 is now suspended in the cassette 17.

When it is required to use the film in the package 22 the protruding end 7 of the leader 6 is pulled sharply. This causes the leader 6 and the film 3 to start to unwind and tears off the lips of the strip 9. Further pulling of the leader 6 will bring out the splice. The leading end of the wound film 3 can then be severed to remove the leader 6. The film material 3 can then be fed into the exposure apparatus.

It is easy to prepare the package of the present invention. It is completely light-tight. When installed in a cassette the roll of photosensitive material unrolls smoothly leaving the torn-off side lips in the cassette. These do not interfere with the unwinding of the roll of photosensitive material.

The annular end covers are particularly easy to place over the core ends as they can be pushed onto the adhesive covered bent-over edge lips which are adhered to the leader. In fact they are much easier to place in position than in one of the prior art proposed packages wherein the end covers are placed underneath the bent-over edge lips.

In the preferred embodiment the segments of the centre of the end covers which are adhered in the hollow core of the roll keep the end covers firmly in place.

What is claimed is:

1. A package, which comprises:

a roll of photosensitive material coiled on a central core in convolutions of increasing radius terminating in a free end, said roll having generally flat end surfaces;

an opaque moisture-proof leader joined to said free end and wrapped circumferentially at least once around said roll, said leader having side edges, an inner surface and an outer surface and being of sufficient width to cover said roll;

a pair of side lips comprising two narrow strips of tearable adhesive material each having an inner edge and an outer edge, said outer edge extending beyond said side edges of said leader, each of said strips being attached to said inner surface of said leader and overlapping one of said side edges, said side lips having an outer surface with a pressure-sensitive adhesive thereon and being folded down directly against said end surfaces;

a strip of backing tape placed over each of said strips and along said side edges; and one pair of annular end covers attached to said outer surface of said side lips to hold the end covers in place over said end surfaces.

2. A package according to claim 1 wherein said leader comprises polyethylene loaded with sufficient carbon black particles to render it light-opaque.

3. A package according to claim 1 wherein said annular end covers have inner portions which can be folded axially inside said core.

4. A package according to claim 3 wherein said inner portions are sealed inside said core.

5. A package according to claim 1 wherein said side lips have a plurality of slits extending inward from an outside edge thereof.

6. A package according to claim 1 wherein said side lips comprise a tearable paper-based material.

7. A package according to claim 1 wherein said central core has an open center and comprises hard cardboard.

8. A package according to claim 1 wherein said leader is attached by a splice to said free end of the roll of photosensitive material.

9. A package according to claim 1 wherein said leader encircles the roll three times.

* * * * *